Patented July 3, 1945

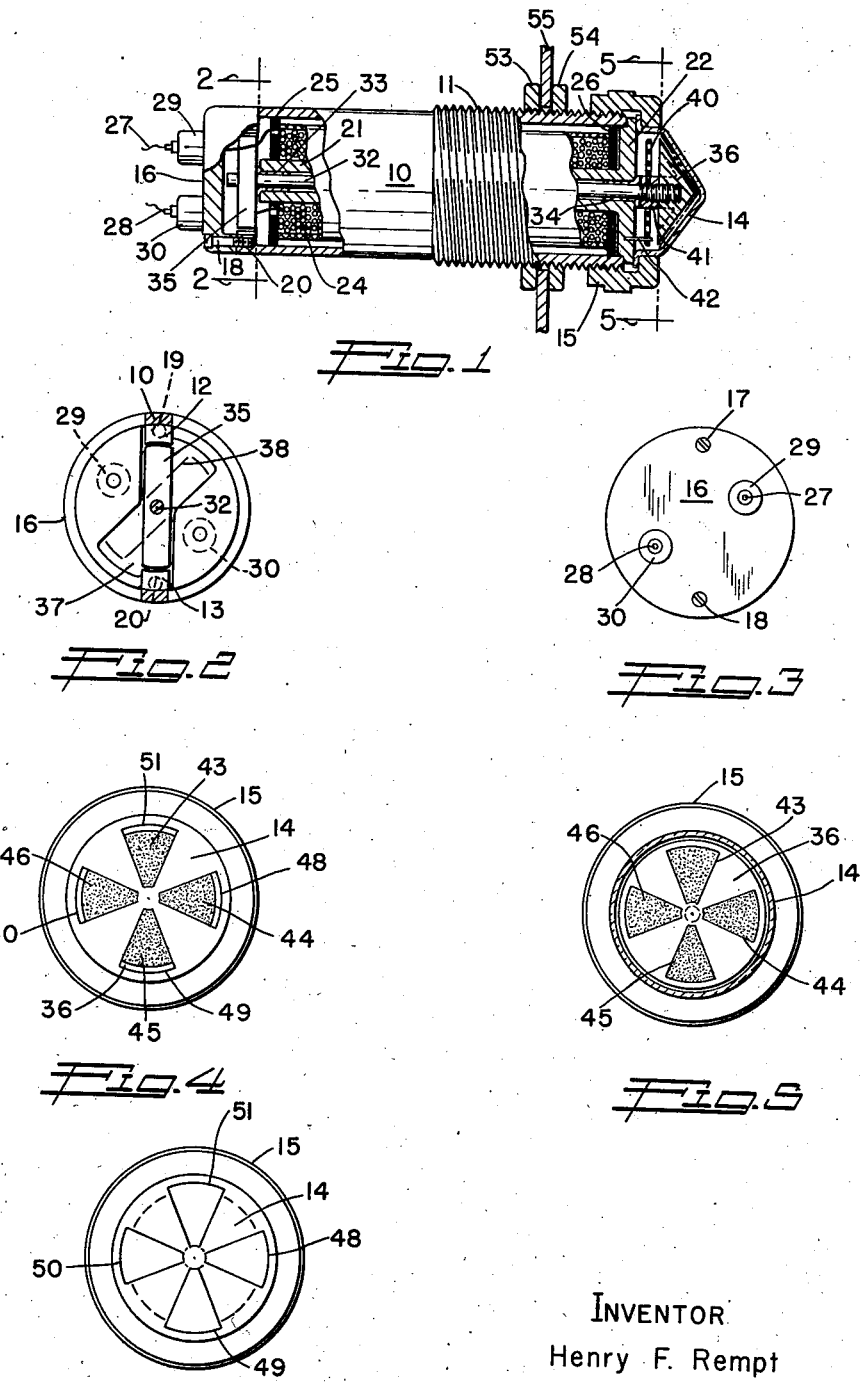

2,379,542

UNITED STATES PATENT OFFICE 2,379,542

INDICATING SIGNAL

Henry F. Rempt, Van Nuys, Calif., assignor to Lockheed Aircraft Corporation, Burbank, Calif.

Application June 3, 1943, Serial No. 489,575

4 Claims. (Cl. 177—329)

This invention relates to visual signals for instrument panels and switch boards and finds its principal application to instrument panels of airplanes and the like aircraft.

Heretofore, in aircraft instrument panels, signal lights have been employed primarily to warn the pilot or flight engineer of the conditions of various apparatus within the aircraft. For example, signal lights have been employed to warn the pilot of the position of the retractable landing gear and landing flaps when the engine throttle is closed. Signal lights have also been employed to warn of failures of pressure in the fuel, oil, oxygen, and various hydraulic lines, and to perform numerous other vital services. Such signal devices have heretofore usually comprised small incandescent electric lights housed in suitable receptacles and positioned behind small, faceted, colored glass bezels located at suitable points in the various instrument panels.

Disadvantages of the incandescent electric types of signal devices were primarily that they were too fragile to withstand the prolonged engine vibration and the shock of cannon and machine gun fire in combat aircraft and were otherwise subject to frequent failure due to burning out of the filament. Moreover, because of the brilliance of the points of light which they produced they had a blurring or blinding effect upon the eyes, interfering with clear vision, particularly at night. Attempts have been made to overcome this latter disadvantage by providing manually adjustable apertures or shutters on the visible portion of the signal device by means of which the emitted light could be dimmed or adjusted to suit the lighting conditions prevalent at a given time. This manual dimming adjustment, however, introduced a further disadvantage and hazard by reason of the fact that when the signal light was dimmed to an extent suitable for night operation in a darkened compartment, if subsequent readjustment were neglected or forgotten, as it was apt to be, the warning light then often could not be seen in the brilliancy of daylight.

Objects of the invention are, therefore, to overcome the disadvantages of the incandescent signal devices heretofore employed particularly in relation to their employment in aircraft instrument panels and to provide a signal device which will be relatively free from the types of failures associated with incandescent lights, and will be non-blinding and equally visible in daylight or night conditions without the necessity of manual adjustment or other attention.

Another object and advantage of the invention resides in providing a signal device, the signal of which may be viewed by an observer throughout a wide range of angles.

The invention in its general aspects resides in an electro-magnetically controlled fluorescent-radioactive-luminescent and reflecting signal body adapted to be energized by visible light, so-called black light or ultraviolet light, or by incorporated radioactive material.

Other objects, advantages, and features of novelty will be evident hereinafter.

In the drawing in which like reference characters refer to similar parts,

Figure 1 is an enlarged side view in partial cross-section of the signal device assembly;

Figure 2 is a cross sectional view taken on line 2—2 of Figure 1;

Figure 3 is a rear-end view of the signal device;

Figure 4 is a front-end view of the signal device as it appears when energized;

Figure 5 is a cross-sectional view taken on line 5—5 of Figure 1; and

Figure 6 is a front-end view of the signal device as it appears when de-energized.

Referring now to the drawing, 10 is a tubular case or housing composed of a ferromagnetic metal such as soft iron provided with threads on the forward outside portion at 11 and carrying at the rear end a pair of diametrically opposed inwardly extending stubs 12 and 13 which constitute pole pieces of the magnetic actuating mechanism hereinafter described.

The forward end of the tubular housing is closed by means of a relatively thin convex or conical shaped transport cover member 14 secured in place by means of a knurled compression nut 15 which makes threaded connection with threads 11. The rear end of the case 10 is closed by a disc shaped cap 16 retained in position by a pair of screws 17 and 18 which pass through the cap body and make threaded connections at 19 and 20 in threaded holes in the housing stubs 12 and 13.

A spool shaped electromagnet is snugly contained within the housing 10, said electromagnet comprising an axially positioned tubular core 21 of ferromagnetic material supported at its forward end mainly by an integrally formed flange 22. A plurality of turns of insulated conductor 24 are wound on the core 21 between insulating annular shaped end pieces 25 and 26 and the conductor ends 27 and 28 brought out through the terminal bushings 29 and 30 forming an integral part of the beforementioned cap 16.

A rod 32 rotatably supported upon a pair of brass bushings 33 and 34 extends concentrically through and projects from the ends of the tubular core 21, and said rod carries fixed to the rearwardly extending end a diametrically positioned armature bar 35, and threaded onto the forward end a conical shaped signal element 36.

The armature bar 35 which may be made of soft iron is limited in the angle through which it may be rotated by the X shaped recess 37 formed within the inside end surface of the cap 16. Thus the armature may rotate from the position indicated in dotted lines at 38 to the position in alignment with the stub pole pieces 12 and 13 as shown in solid lines at 35. The armature 35 is normally retained in the position shown in dotted lines at 38 by means of the torsion of a spiral hair spring 40 acting through the rod 32 to which the said armature is fixed. The inner end of the hair spring 40 is attached to a lock nut 41 threaded on the forward end of the rod 32 and the outer end is attached to a pin 42 carried in the core flange 22.

The forward conical surface of the signal element 36 carries a plurality of zonal areas of fluorescent or luminescent material arranged to appear in the form of four equally spaced circular sectors as viewed from the front as best shown at 43—46 in Figure 5. The so-called circular sector zones of fluorescent material are circumferentially spaced apart edge to edge at distances equal to their widths.

The conical shaped cover member 14 which, as before stated, may be composed of a transparent material, is rendered opaque at all other points except at four equally spaced windows 48—51 which are adapted to exactly match in size, shape, and relative circumferential position the said four fluorescent zones 43—46, whereby the fluorescent zones will be entirely visible when aligned with the transparent windows 48—51 in the cover 14 as shown in Figure 4 and entirely hidden behind the intervening opaque spaces between the windows in the cover as shown in Figure 6 when the signal element 36 is rotationally displaced one-eighth of a turn or 45° from such aligned position.

A pair of annular nuts 53 and 54 carried on threads 11 serve to adjustably retain the case 10 of the unit in an aperture of suitable diameter in an instrument panel sheet 55.

In operation the conductor leads 27 and 28 extending from the windings 24 of the electromagnet may be connected in series with a suitable source of electric current and suitable contacts or switching devices associated with and actuated by the mechanism for which signal impulses are desired. For example the conductor leads 27 and 28 may be connected by way of a suitable source of direct current such as a battery to electrical contacts actuated by the combined action of the engine throttle and the retractable landing gear mechanism so that if the throttle is closed when the landing gear is still retracted the electrical supply circuit will be completed through the windings of the signal device to give a warning that the aircraft is unsafe to land.

Upon thus energizing the windings 24 of the electromagnet, the armature will be magnetically attracted to the pole pieces 12 and 13 and thereby rotated against the opposing torque of the spiral spring 40 from the position shown in dotted lines at 38 to the position shown in solid lines at 35 in alignment with said pole pieces. In this position the fluorescent zones 43—46 on the conical element 36 are in registration with the transparent windows 48—51 in the adjacent cover piece 14 and are fully visible as shown in Figure 4. Upon de-energization of the windings 24 the armature under the restoring torque of the spring 40 will drop back to the position shown in dotted lines at 38 carrying the fluorescent zones 43—46 to a position out of registration with the transparent windows 48—51 and back of the opaque area in the adjacent cover piece 14 where they are completely hidden from view as shown in Figure 6.

The conical cover element 14 is preferably formed of a relatively thin section of a suitable plastic material transparent to both visible and ultraviolet light such as for example a methyl methacrylate resin of the types known as "lucite" while the signal element 36 and cap 16 may be formed of metal or any suitable plastic such as cellulose acetate or vinyl resin. The cover element 14 may be rendered opaque at all points except at the transparent windows by means of an internally or externally applied coating of black lacquer or by pigments impregnated in the plastic material. The signal element 36 and all other parts of the device also are preferably colored black at all points except the beforementioned fluorescent areas.

The fluorescent material may be one of several fluorescent paints or lacquers depending upon the color of fluorescence desired and they may be applied in a thin layer by suitable means to the said areas of the signal element 14. Suitable luminous paints may be obtained from several sources as disclosed in the Department of Commerce, National Bureau of Standards, Circular Letter LC 678.

Such materials are excited to fluorescence by sunlight and various artificial lights, but for use at night in a darkened compartment the fluorescent signal element is preferably energized by means of a suitable ultraviolet lighting unit. The fluorescent material on the signal element may also be rendered self-luminous by incorporating a minute quantity of radioactive material in its composition as is well known. A small amount of admixed pigment of a suitable color corresponding to that at which the material fluoresces is desirable when the instrument may be viewed totally or partially by reflected light.

A particular feature of the signal device of this invention resides in its small diameter and shape which adapts it to be readily installed in switch board and instrument panel bezel apertures substantially interchangeable with the incandescent light types or signal devices heretofore employed for such purposes. Another important and novel feature of the instrument resides in the angular shape of the signalling surface and its projection forward from the body of the instrument into the convex transparent cover whereby it may be readily viewed from a wide range of angles.

The size of wire and number of turns employed in the electromagnet will depend upon the voltage of the electrical system to which it is to be connected. For example, in use in an aircraft electrical system of 24 volts, the wire may be number 36 or 40 double cotton covered copper wire of sufficient turns to have a resistance of approximately 300 ohms resistance for a current flow of from 0.08 to 0.10 ampere.

An advantage in this instrument in combination with the employment of a fluorescent-radioactive-luminescent material resides in the ability of the signal to be readily seen at substantially any position and under all lighting conditions without adjustment at any time, either in the daylight by combined fluorescent and reflected light, or at night by ultraviolet light excitation or in case of failure of such excitation by its radioactively excited luminosity.

The foregoing is illustrative of the apparatus of the invention and is not to be limiting. The invention includes any equivalent apparatus within the scope of the claims.

I claim:

1. A signal device comprising a housing, an electromagnet in said housing, an armature in said housing, means for applying a restoring force to said armature, said armature being adapted to be moved between limits respectively in response to energization of said electromagnet and the restoring force of said means, a curved transparent cover having spaced opaque zones thereon, said cover being attached to and extending outward from the forward end of said housing, a fluorescent signal surface having spaced fluorescent zones thereon matching the opaque zones of the cover, said surface extending into the curved space back of said cover, said signal surface being adapted to be moved between exposed and hidden positions back of said cover in response to said movement of said armature.

2. A signal device comprising a housing, an electromagnet in said housing, an armature in said housing, means for applying a restoring force to said armature, said armature being adapted to be moved between limits respectively in response to energization of said electromagnet and the restoring force of said means, a curved cover having spaced transparent zones therein, said cover being attached to and extending outward from the forward end of said housing, a fluorescent signal surface having spaced fluorescent zones thereon corresponding to the transparent zones in the cover, said surface extending into the curved space back of said cover, said signal surface being adapted to be rotated between exposed and hidden positions back of said cover in response to said movement of said armature.

3. A signal device comprising a housing, an electromagnet in said housing, an armature in said housing, means for applying a restoring force to said armature, said armature being adapted to be moved between limits respectively in response to energization of said electromagnet and the restoring force of said means, a convex transparent cover attached to and extending outward from the forward end of said housing, said cover having opaque and transparent zones, a convex fluorescent signal surface extending into the space immediately back of said cover, said signal surface having spaced fluorescent zones corresponding to the opaque zones of the cover and being adapted to be rotated between exposed and hidden positions back of said cover in response to said movement of said armature.

4. A signal device comprising a housing, an electromagnet in said housing, an armature in said housing, means for applying a restoring force to said armature, said armature being adapted to be moved between limits respectively in response to energization of said electromagnet and the restoring force of said means, a convex transparent cover having alternate opaque and transparent zones attached to and extending outward from the forward end of said housing, a convex fluorescent signal surface having alternate fluorescent and non-fluorescent zones and extending into the space immediately back of said cover, said fluorescent zones on said signal surface being adapted to be rotated between exposed and hidden positions back of said opaque and transparent zones on said cover in response to said movement of said armature.

HENRY F. REMPT.